United States Patent [19]
Do et al.

[11] Patent Number: 5,608,554
[45] Date of Patent: Mar. 4, 1997

[54] LCD HAVING A PHOSPHOR LAYER AND A BACKLIGHT SOURCE WITH A MAIN EMITTING PEAK IN THE REGION OF 380-420NM

[75] Inventors: Young-rag Do, Suwon; Young-chul You, Seoul; Joa-young Jeong, Suwon; Yong-chan You, Seoul, all of Rep. of Korea

[73] Assignee: Samsung Display Devices Co., Ltd., Kyungki-do, Rep. of Korea

[21] Appl. No.: 385,514

[22] Filed: Feb. 8, 1995

[30] Foreign Application Priority Data

Jul. 26, 1994 [KR] Rep. of Korea .................... 94-18087

[51] Int. Cl.$^6$ .................................. G02F 1/1335
[52] U.S. Cl. ................... 349/70; 349/61; 349/71
[58] Field of Search ................... 359/50, 48, 49; 313/486

[56] References Cited

U.S. PATENT DOCUMENTS

| | | | |
|---|---|---|---|
| 4,470,666 | 9/1984 | Eick | 359/50 |
| 4,678,285 | 7/1987 | Ohta et al. | 359/50 |
| 4,772,885 | 9/1988 | Uehara et al. | 359/50 |
| 4,793,691 | 12/1988 | Enomoto et al. | 359/50 |
| 5,231,328 | 7/1993 | Hisamune et al. | 313/486 |
| 5,233,459 | 8/1993 | Bozler et al. | 359/230 |
| 5,374,493 | 12/1994 | Fukunaga et al. | 430/7 |

FOREIGN PATENT DOCUMENTS

| | | | |
|---|---|---|---|
| 587123A2 | 3/1994 | European Pat. Off. . | |
| 60-61725 | 4/1985 | Japan | 359/50 |
| 60-149028 | 8/1985 | Japan | 359/50 |
| 61-169824 | 7/1986 | Japan | 359/50 |
| 3-116022 | 5/1991 | Japan | 359/50 |
| 6-222360 | 8/1994 | Japan | 359/50 |

OTHER PUBLICATIONS

"Cathodoluminescent Backlight For Liquid Crystal Displays", Research Disclosure, Jan. 1991, No. 321, Kenneth Mason Publications Ltd, England.
Patent Abstracts Of Japan, "Color Cathode Ray Tube Responsive To Light Pen", Ishii, Jun. 1993, [JP 60–4585].
Patent Abstracts Of Japan, "Phosphor Screen For Cathode Ray Tube", Kusuki et al, Jun. 1989, [JP 03–6290].

Primary Examiner—Anita Pellman Gross
Assistant Examiner—Toan Ton
Attorney, Agent, or Firm—Lowe, Price, LeBlanc & Becker

[57] ABSTRACT

A display device includes a backlight having a main emitting peak in the region of 380–420 nm, a polarizer for selecting light having prescribed direction among the light emitted from a backlight source and an analyzer for receiving the selected light, a pair of electrodes provided between the polarizer and analyzer, optoelectronic material such as liquid crystal materials and PLZT provided between the electrodes, and a phosphor layer including phosphors which can be stimulated by exposure to the light from the backlight source. The display device has an increased viewing angle and improved luminance.

9 Claims, 5 Drawing Sheets

LCD HAVING A PHOSPHOR LAYER AND A BACKLIGHT SOURCE WITH A MAIN EMITTING PEAK IN THE REGION OF 380-420NM

BACKGROUND OF THE INVENTION

The present invention relates to a display device and particularly to a display device having a wide viewing angle and enhanced luminance by employing a deep blue backlight lamp and a phosphor layer stimulated by the lamp.

An optoelectronic display device is a light receiving display device such as an LCD device or a PLZT device. The light receiving display device has a basic structure in which liquid crystal material or PLZT optoelectronic material is sandwiched between longitudinal and latitudinal electrodes. An analyzer is on the front side and a polarizer is on the back side. In order to obtain full color display using such a device, a white light source (backlight) on the back side and red, green, blue color filters arranged on each pixel on the front side are provided to drive the optoelectronic material.

The structure of this type of optoelectronic display device is illustrated in detail with reference to the attached FIG. 1. In this figure, a backlight 1 emits white light from the back side, a polarizer 2 selects only light having a prescribed direction among the emitted backlight, and an analyzer 6 receives the selected light. Between the polarizer 2 and analyzer 6, an optoelectronic material 4 being sandwiched by latitudinal and longitudinal electrodes 3 and 5 is provided. On the front side, a pattern of color filter 7 is formed on a substrate 10. In the other basic system, the pattern of color filter 7 can be located between the electrode 5 and the analyzer 6. According to the previous systems, the location of the color filter can be subtle.

A liquid crystal display device employing TN (twisted nematic), STN (super twisted nematic) or ferroelectic liquid crystal as an optoelectronic material, which constitutes the main current draw of the liquid crystal display device, utilizes an optoelectronic effect by which a molecular orientation of liquid crystal material changes based on an applied electrical field or heat. Since such a device operates at low voltage and consumes a little electric power, and the display pattern dimensions can be freely designed, this device has a wide range of applications, including flat panel displays such as those for use in a liquid crystal color television, as well as, laptop computers, digital displays and digital watches.

Another optoelectronic material, PLZT, is a transparent ferroelectric material which is represented by the general formula of $(Pb_{1-x}La_x)(Zr_{1-y}Ti_y)_{1-x/4}O_3$ ($0<x \leq 0.3$, $0 \leq y \leq 1.0$). According to the composition ratio of the material, this shows various electric and optic characteristics. Recently, research and development work has been widely carried out on various display devices (photo-modulators, photo-switches, photo-shutter, etc.) using this material.

However, since the above-mentioned devices employ a polarizer, luminance is low due to the poor light utilization efficiency. Moreover, since the light from the backlight, i.e., white light, should pass through the PLZT or liquid crystal material, the electrodes, polarizer and a color filter, the light intensity is severely weakened compared with the originally emitted white light. Also, since the LC or PLZT shutter limits the traveling angle of backlight, the light via a light shutter results in a very narrow viewing angle.

SUMMARY OF THE INVENTION

An object of the present invention to overcome the problems of the narrow viewing angle and low luminance in an optoelectronic display, is to provide a display device adopting phosphors which can be stimulated by photo energy of the deep blue region instead of the color filter used in a conventional optoelectronic display, and a deep blue light source instead of the white backlight.

The object of the present invention is accomplished by a display device comprising a backlight source whose main emitting peak is in the region of 380–420 nm, a polarizer for selecting light having a prescribed direction among the light emitted from the backlight source, an analyzer for receiving the selected light, a pair of electrodes provided between the polarizer and analyzer, optoelectronic material provided between the electrodes, and a phosphor layer including phosphors which can be stimulated by exposure to the light from the backlight source.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

The preferred backlight source is a lamp which includes at least one deep blue emitting phosphor selected from the group consisting of $SrP_2O_7$:Eu (420 nm), $SrMgP_2O_7$:Eu (394 nm), $Sr_3(PO_4)_2$:Eu (408 nm), $(Sr,Ba)Al_2Si_2O_8$:Eu (400 nm), $Y_2Si_2O_7$:Ce (385 nm), $ZnGa_2O_4$:Li,Ti (380 nm), $YTaO_4$:Nb (400 nm), $CaWO_4$ (410 nm), BaFX:Eu (wherein X represents halogen, 380 nm), $(Sr,Ca)O.2B_2O_3$:Eu (380–450 nm), $SrAl_{12}O_{14}$:Eu (400 nm) and $Y_2SiO_5$:Ce (400 nm). Here, the numerals in parentheses correspond to the main peak wavelength for each compound.

Figure 3:
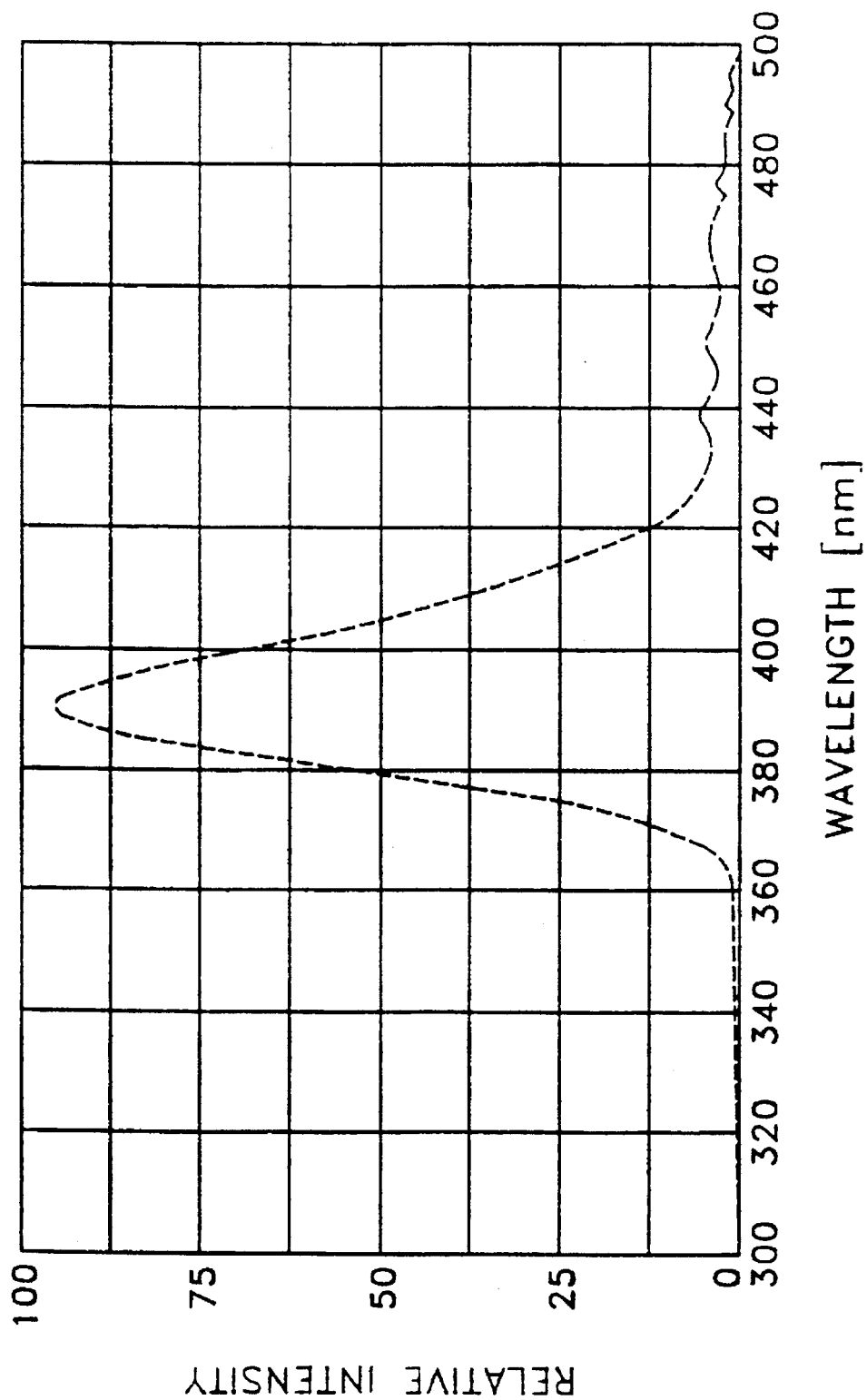
FIG. 3 is an emission spectrum of a deep blue emitting phosphor, $SrMgP_2O_7$:Eu when excited by 254 nm light.

An emission spectrum of $SrMgP_2O_7$:Eu among the above-mentioned phosphors is illustrated in FIG. 3 when is excited by 254 nm ultraviolet.

The preferred phosphor includes at least one blue emitting phosphor selected from the group consisting of $Sr_{10}(PO_4)_6Cl_2$:$Eu^{2+}$ (447 nm), $(Sr_{0.9}Ca_{0.1})_{10}(PO_4)_6Cl_2$:Eu (452 nm), $Ba_{3-x}Sr_xSi_2O_8$:Eu (450 nm), $Ba_{3-x}Sr_xSi_2O_8$:Eu (x is 0~3, 440~460 nm), $Ba_5SiO_4Cl_6$:Eu (440 nm), ZnS:Ag,Cl, ZnS:Ag,Al, ZnS:Ag and ZnS:Ag,Ga; at least one green emitting phosphor selected from the group consisting of $SrAl_2O_4$:Eu (520 nm), $SrGa_2S_4$:Eu (518 nm), $Ca_3SiO_4Cl_2$:Eu (510 nm), $Ba_{2-x}Sr_xSiO_4$:$Eu^{2+}$ (x is 0~2, 505~575 nm), $Y_3Al_5O_{12}$:Ce (540 nm), $BaZrO_3$:Eu, ZnS:Cu, ZnS:Cu,Al and ZnS:Cu,Au,Al; and at least one red emitting phosphor selected from the group consisting of $6MgO.As_2O_5$:Mn (655 nm), $3.5MgO.0.5MgF_2.GeO_2$:Mn (655 nm), $Na_5Eu(W_{1-x}Mo_xO_4)_4$(x is 0~1), $K_5Eu(W_{1-}$ $_x$Mo$_x$O$_4$)$_4$ (x is 0~1), SrY$_2$S$_4$:Eu, SrY$_2$S$_4$:Mn and Y$_2$O$_2$S:Eu, NaGd$_{1-x}$Eu$_x$TiO$_4$ (x is 0~1). Here, the numerals in parentheses correspond to the wavelength of the main emitting peak of each compound when stimulated by a deep blue backlight.

Figure 4:
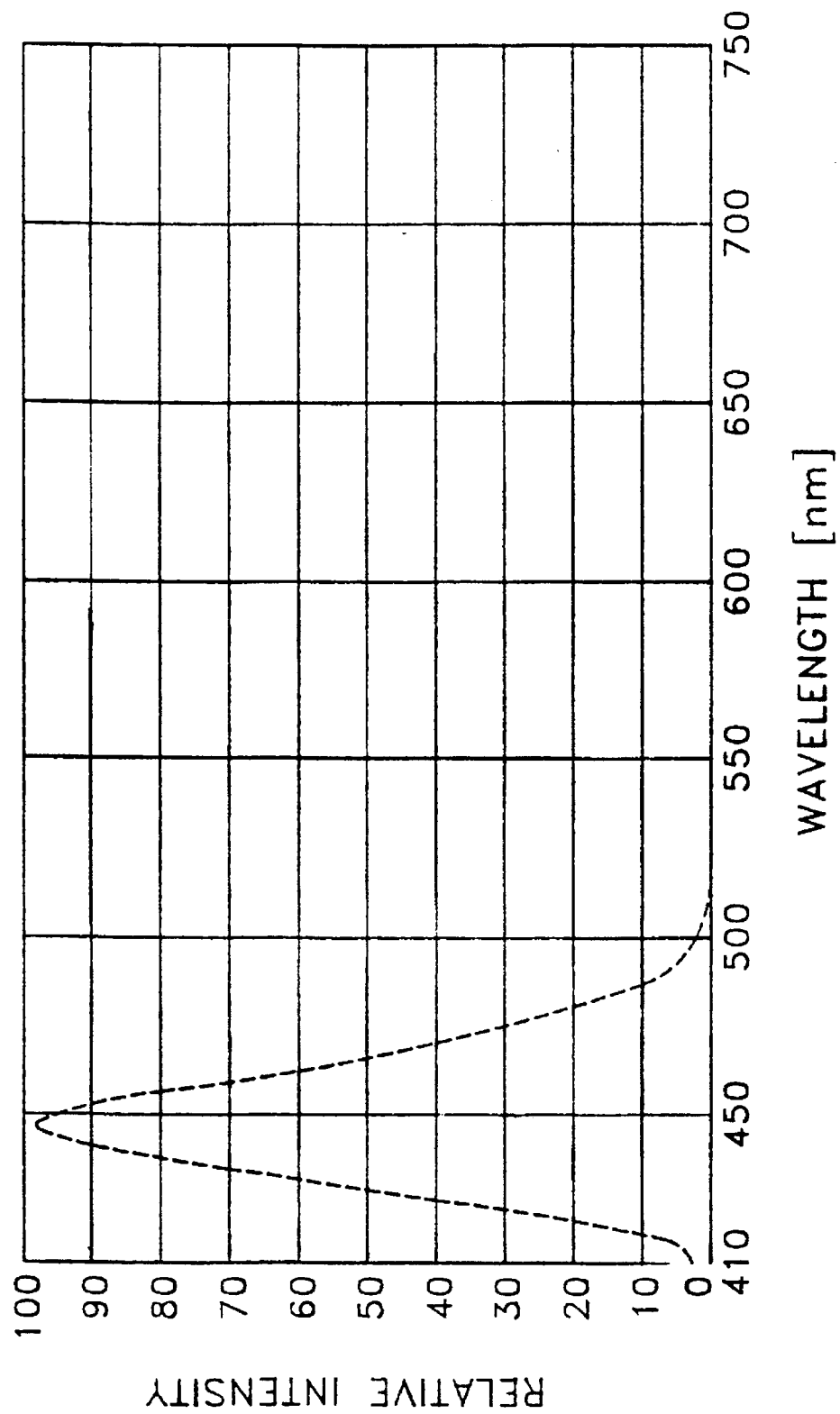
FIG. 4 is an emission spectrum of a blue emitting phosphor of $Sr_{10}(PO_4)_6Cl_2$:Eu when is excited by 394 nm light.
Figure 5:
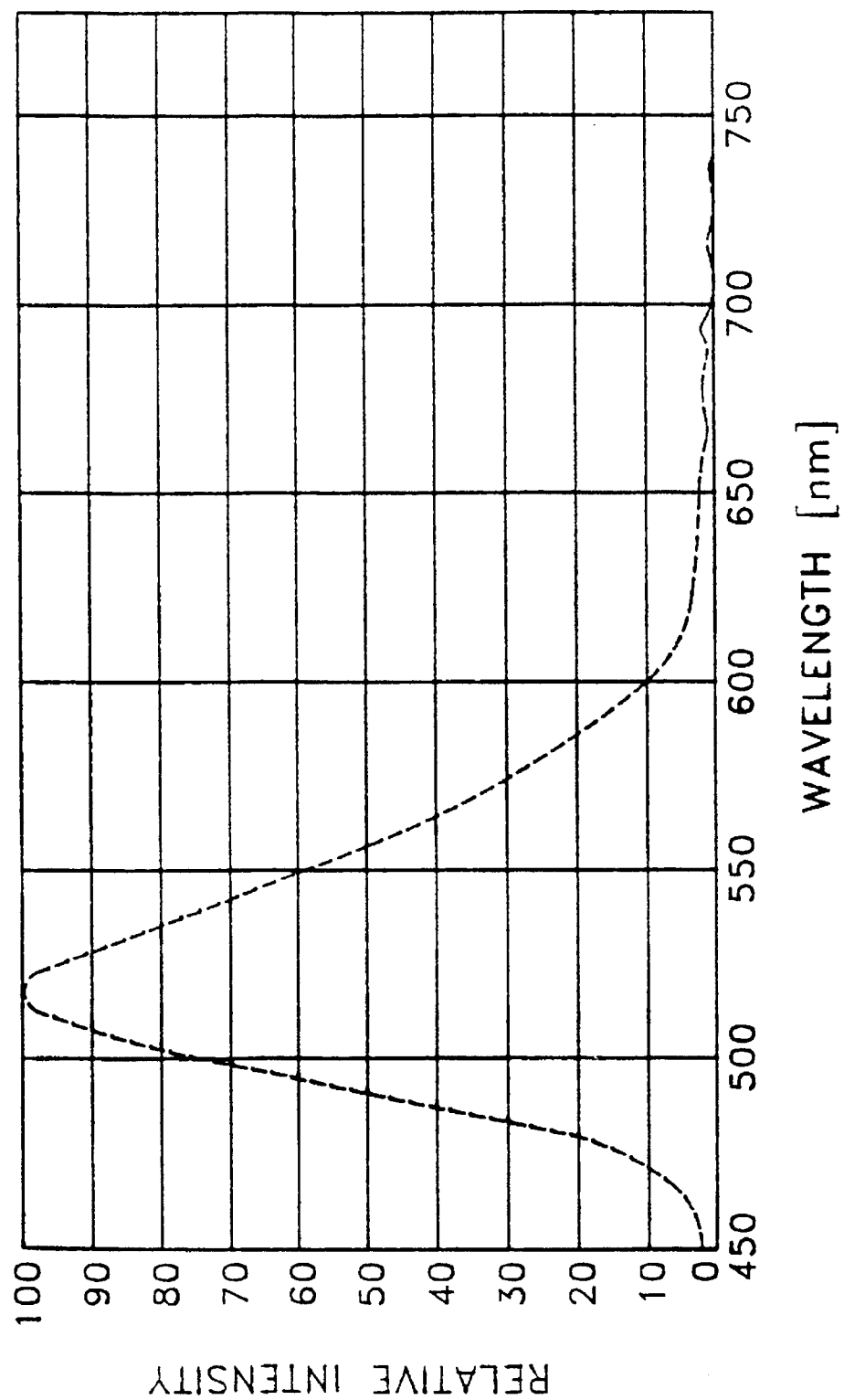
FIG. 5 is an emission spectrum of a green emitting phosphor of $SrGa_2S_4$:Eu when is excited by 394 nm light.
Figure 6:
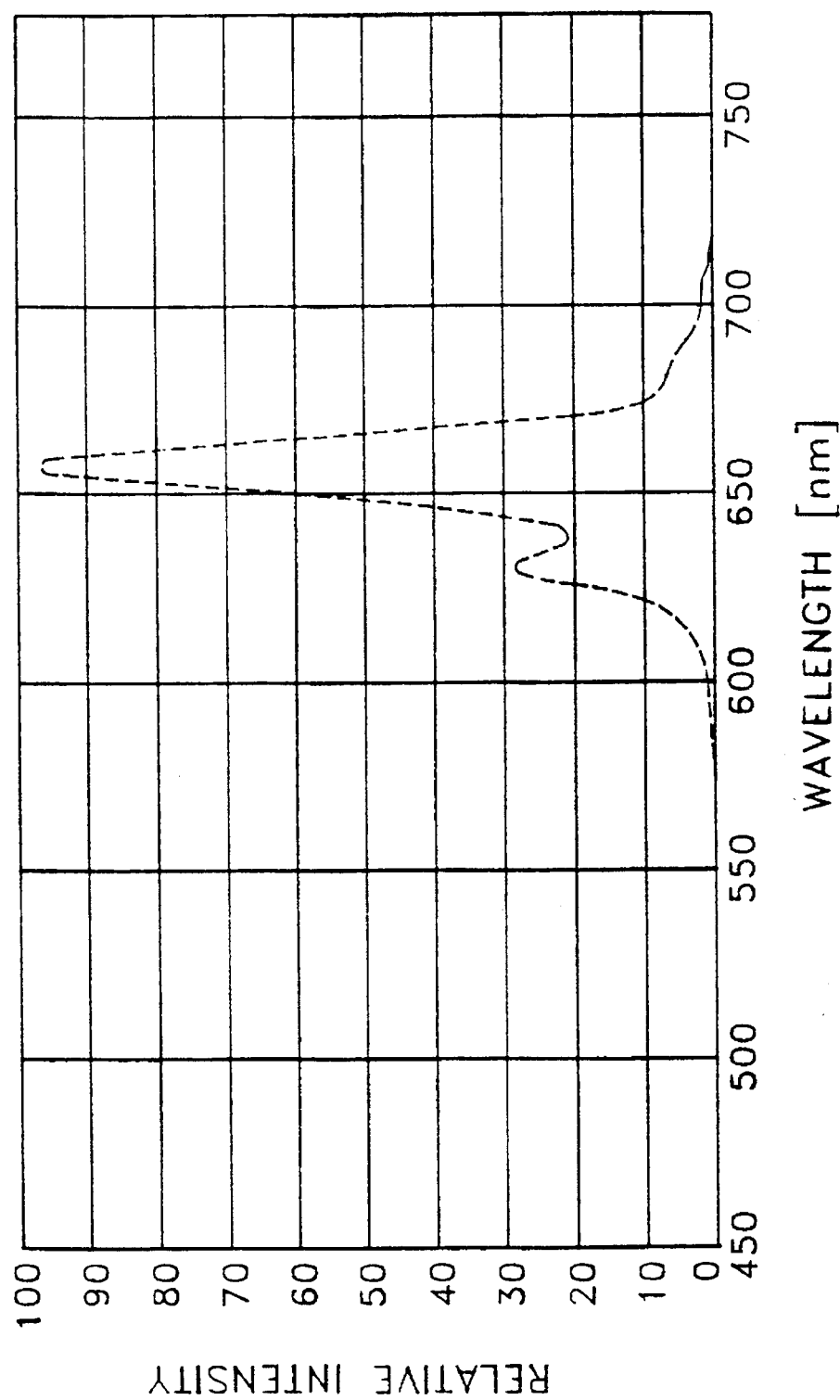
FIG. 6 is an emission spectrum of a red emitting phosphor of $3.5MgO.0.5MgF_2.GeO_2$:Mn when is excited by 394 nm light.

In FIGS. 4–6, emission spectrums of blue (Sr$_{10}$(PO$_4$)$_6$Cl$_2$:Eu), green (SrGa$_2$S$_4$:Eu) and red (3.5MgO.0.5MgF$_2$.GeO$_2$:Mn) emitting phosphors among the above-mentioned phosphors are illustrated when are excited by 394 nm deep blue light. An appropriate selection among the blue, green and red phosphors will give color display device having good characteristics.

Preferably, the display device is further provided with a backlight-transmitting mirror for reflecting the emitted light in all directions from the phosphors, forwardly through the device, to improve the emitting efficiency. The backlight-transmitting mirror transmits the backlight, while reflecting the light emitted from the phosphors.

The display device of the present invention employs light in the deep blue region as a backlight source instead of the white light, and phosphors being stimulated by the light of the deep blue region instead of a color filter, to greatly improve viewing angle and luminance. The light passed through the conventional optoelectronic device which has color filter is transmitted straight, while the light emitted from the phosphors of the present invention has the characteristics of omnidirectional emission, to thereby improve the viewing angle. Moreover, since the backlight does not go through a color filter, the amount of light attenuation caused from the color filter can be reduced, resulting in a net increase in luminance.

As a backlight source in the present invention, the deep blue region light is selected considering that the liquid crystal in an LCD is liable to be chemically changed by the ultraviolet light, the ultraviolet light does not transmit the PLZT and the intensity of the transmitted light is weakened when near ultraviolet lamp is used.

The backlight source used in the present invention emits light of the wavelength region 380–420 nm. Here, if the wavelength is less than 380 nm and the optoelectronic material is liquid crystal, the liquid crystal material is decomposed. Meanwhile, if the wavelength is less than 380 nm and PLZT is used, ultraviolet cut-off is induced so that the light intensity to stimulate the phosphors in the front side is too weak. On the other hand, if the wavelength exceeds 420 nm, the color reproduction range is too narrow.

The phosphor can be employed in the display device of the present invention using a method similar to that applied in forming a phosphor layer of the conventional CRT.

That is, a black matrix pattern layer is provided to absorb the external light and a phosphor layer is formed between the black matrix patterns which emits light of each color by the backlight. Here, the black matrix is formed as a light absorbing graphite layer by a photoresist method. First, a photoresist pattern is formed by washing the inside of a substrate, coating a photoresist comprising polyvinyl alcohol, sodium dichromate, a polymer of propylene oxide and ethylene oxide, acryl emulsion and pure water, on the inner surface of the substrate, drying and developing the coated substrate. Graphite is coated on the surface of the substrate where photoresist pattern is formed and is etched using hydrogen peroxide to remove the photoresist and to thereby form the black matrix layer. Then, on the surface of the black matrix layer, a phosphor slurry including phosphor particles of a first type, pure water and polyvinyl alcohol is coated, dried, exposed, developed, washed and dried to form a first phosphor layer. A second phosphor layer and a third phosphor layer are subsequently formed according to the same method, to form a phosphor layer having three color emitting phosphors.

Figure 1:
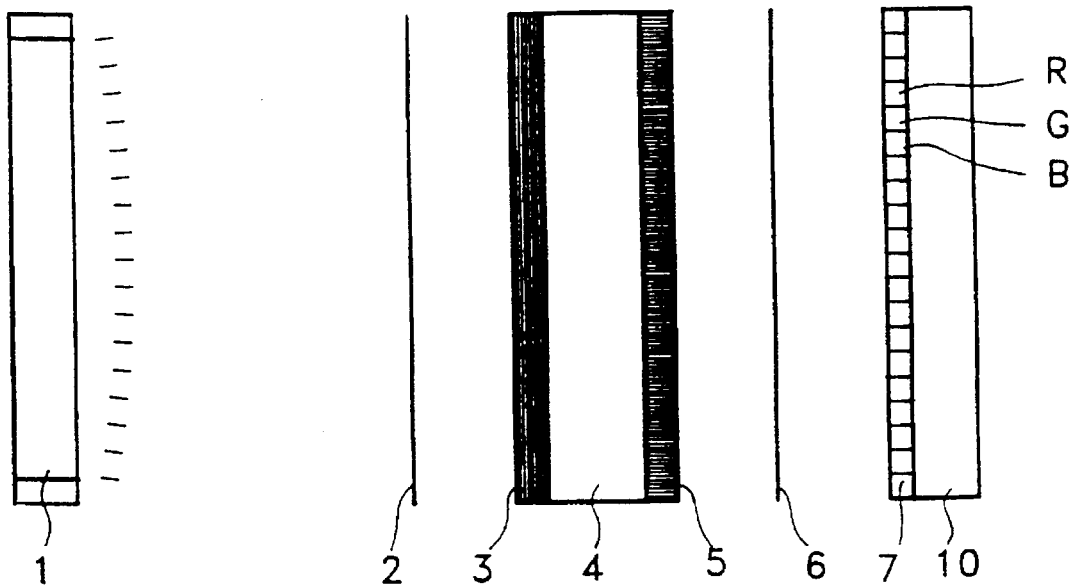
FIG. 1 is a schematic structure of the conventional display device.
Figure 2:
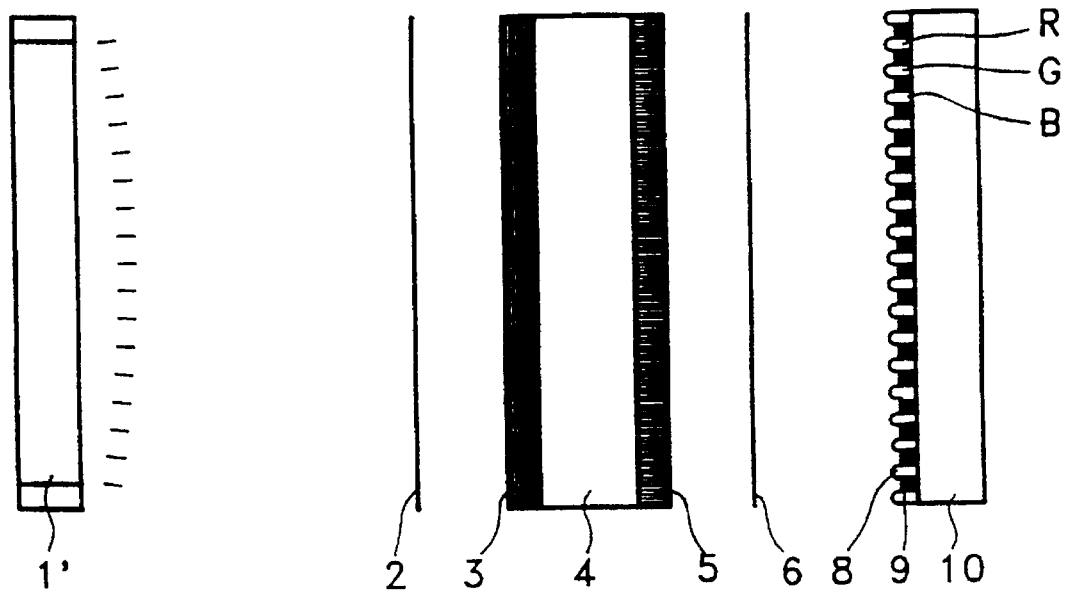
FIG. 2 is a schematic structure of the display device according to an embodiment of the present invention.

FIG. 2 schematically illustrates a preferred display device according to an embodiment of the present invention. A backlight 1' in the back side (the left side in the drawing) emits deep blue region light, a polarizer 2 selects only light having a prescribed direction among the backlight, an analyzer 6 receives the selected light. Also, between the polarizer 2 and the analyzer 6, latitudinal electrode 3, optoelectronic material 4, and longitudinal electrodes 5 are provided. On the front side (the right side in the drawing), a phosphor pattern 8 and a black matrix 9 are formed on the substrate 10 such as glass.

The display device of the present invention is provided with a phosphor layer emitting each color instead of the color filter of the conventional device. The light emitted from the backlight and transmitted via the polarizer passes through the optoelectronic material via a different path in accordance with whether a voltage is applied to a pair of transparent electrodes or not. The transmitted light is transmitted or cut off by the analyzer. The transmitted light stimulates the prescribed phosphor on the phosphor layer and the stimulated phosphor emits light of the corresponding wavelength in all directions.

As shown above, since the display device of the present invention reproduces each color by using the phosphors for emitting color light omnidirectionally and a light source for stimulating the phosphor, the device has an improved viewing angle and increased luminance when compared with the conventional display device.

The display device of the present invention is novel and can replace an optoelectronic display such as an STN-type LCD, a TFT-type LCD, an FLCD or PLZT device.

What is claimed is:

1. A display device comprising:
   a backlight source comprising deep blue light having an emission spectrum with a main emitting peak in the region of 380–420 nm;
   a polarizer for selecting light having a prescribed direction among the light emitted from said backlight source;
   an analyzer for receiving the selected light;
   a pair of electrodes provided between said polarizer and said analyzer;
   optoelectronic material provided between said pair of electrodes; and
   a phosphor layer including phosphors which can be stimulated by exposure to the light from said backlight source.

2. A display device as claimed in claim 1, wherein said backlight source is comprised of at least one material selected from the group consisting of SrP$_2$O$_7$:Eu, SrMgP$_2$O$_7$:Eu, Sr$_3$(PO$_4$)$_2$:Eu, (Sr,Ba)Al$_2$Si$_2$O$_8$:Eu, Y$_2$Si$_2$O$_7$:Ce, ZnGa$_2$O$_4$:Li,Ti, YTaO$_4$:Nb, CaWO$_4$, BaFX:Eu (wherein X represents halogen), (Sr,Ca)O.2B$_2$O$_3$:Eu, SrAl$_{12}$O$_{14}$: Eu and Y$_2$SiO$_5$:Ce.

3. A display device as claimed in claim 1, wherein said phosphors are comprised of at least one blue emitting phosphor selected from the group consisting of Sr$_{10}$(PO$_4$)$_6$Cl$_2$:Eu$^{2+}$, (Sr$_{0.9}$Ca$_{0.1}$)$_{10}$(PO$_4$)$_6$Cl$_2$:Eu, BaMg$_2$Al$_{16}$O$_{27}$:Eu, Ba$_{3-x}$Sr$_x$MgSi$_2$O$_8$:Eu (x is 0~3), Ba$_5$SiO$_4$Cl$_6$:Eu, ZnS:Ag,Cl, ZnS:Ag,Al, ZnS:Ag and ZnS:Ag,Ga, at least one green emitting phosphor selected from the group consisting of $SrAl_2O_4$:Eu, $SrGa_2S_4$:Eu, $Ca_3SiO_4Cl_2$:Eu, $Ba_{2-x}Sr_xSiO_4$:Eu (x is 0–2), $BaZrO_3$:$Eu^{2+}$, $Y_3Al_5O_{12}$:Ce, ZnS:Cu, ZnS:Cu,Al and ZnS:Cu,Au,Al, and at least one red emitting phosphor selected from the group consisting of $6MgO.As_2O_5$:Mn, $3.5MgO.0.5MgF_2.GeO_2$:Mn, $SrY_2S_4$:Eu, $Na_5Eu(W_{1-x}Mo_xO_4)_4$ (x is 0~1), $K_5Eu(W_{1-x}Mo_xO_4)_4$ (x is 0~1), $SrY_2S_4$:Mn $Y_2O_2S$:Eu and $NaGd_{1-x}Eu_xTiO_4$ (x is 0~1).

4. A display device as claimed in claim 1, wherein said phosphor layer comprises phosphor patterns of red, green and blue emitting phosphors, and a black matrix layer consisting of carbon black between said phosphor patterns.

5. A display device as claimed in claim 1, wherein said optoelectronic material is one selected from the group consisting of liquid crystal material and PLZT.

6. A display device as claimed in claim 1, wherein the light emitted from the phosphors includes characteristics of omnidirectional emission, to thereby improve the viewing angle.

7. A display device as claimed in claim 1, wherein the display device further comprises a backlight-transmitting mirror for reflecting the light in all directions emitted from the phosphors to improve emitting efficiency.

8. A display device as claimed in claim 1, wherein said phosphor layer comprises phosphor patterns of red, green and blue emitting phosphors, and a black matrix layer formed as a light absorbing graphite layer of carbon black between said phosphor patterns.

9. A display device comprising:

a backlight source comprising deep blue light having an emission spectrum with a main emitting peak wavelength in the region of 380–420 nm;

a polarizer for selecting light having a prescribed direction among the light emitted from said backlight source;

an analyzer for receiving the selected light;

a pair of electrodes provided between said polarizer and said analyzer;

optoelectronic material provided between said pair of electrodes;

a phosphor layer including phosphors which can be stimulated by exposure to the light from said backlight source, said phosphor layer comprising phosphor patterns of red, green and blue emitting phosphors, and a black matrix layer formed as a light absorbing graphite layer of carbon black between said phosphor patterns, and the light emitted from the phosphors including characteristics of omnidirectional emission, to improve the viewing angle; and a backlight-transmitting mirror for reflecting the light in all directions emitted from the phosphors to improve emitting efficiency.

* * * * *